INVENTORS
ROBERT K. HOFFMAN
ARTHUR R. DOLEGOWSKI
BY
Sheridan and Ross
ATTORNEYS

AEROSOL LUBRICATORS

Filed June 8, 1965 8 Sheets-Sheet 2

INVENTORS
ROBERT K. HOFFMAN
ARTHUR R. DOLEGOWSKI
BY
Sheridan and Ross
ATTORNEYS

AEROSOL LUBRICATORS

Filed June 8, 1965 8 Sheets-Sheet 3

INVENTORS
ROBERT K. HOFFMAN
ARTHUR R. DOLEGOWSKI
BY
Sheridan and Ross
ATTORNEYS

Feb. 13, 1968 R. K. HOFFMAN ET AL 3,368,645

AEROSOL LUBRICATORS

Filed June 8, 1965 8 Sheets-Sheet 4

INVENTORS
ROBERT K. HOFFMAN
ARTHUR R. DOLEGOWSKI
BY
Sheridan and Ross
ATTORNEYS

INVENTORS
ROBERT K. HOFFMAN
ARTHUR R. DOLEGOWSKI
BY
Sheridan and Ross
ATTORNEYS

AEROSOL LUBRICATORS

Filed June 8, 1965 8 Sheets-Sheet 6

INVENTORS
ROBERT K. HOFFMAN
ARTHUR R. DOLEGOWSKI
BY
Sheridan and Ross
ATTORNEYS

INVENTORS
ROBERT K. HOFFMAN
ARTHUR R. DOLEGOWSKI
BY
Sheridan and Ross
ATTORNEYS

INVENTORS
ROBERT K. HOFFMAN
ARTHUR R. DOLEGOWSKI
BY
Sheridan and Ross
ATTORNEYS

United States Patent Office 3,368,645
Patented Feb. 13, 1968

3,368,645
AEROSOL LUBRICATORS

Robert K. Hoffman, Littleton, and Arthur R. Dolegowski, Denver, Colo., assignors to C. A. Norgren Co., Littleton, Colo., a corporation of Colorado Filed June 8, 1965, Ser. No. 462,356
20 Claims. (Cl. 184—55)

ABSTRACT OF THE DISCLOSURE

This invention relates to an aerosol lubricator or generator utilizing a hollow gas annulus through which must pass substantially all pressurized gas that is to flow through the lubricator for substantially all operating conditions thereof. The lubricator may be constructed for either unidirectional or bidirectional flow of gas through the hollow gas annulus. The lubricator contains a lubricant feed means including a terminating portion terminating in a plane substantially perpendicular to the direction of gas flow through the gas annulus whereby the lubricant is fed into the gas annulus at the region of smallest cross-sectional area of said gas annulus to join pressurized gas thus creating aerosol for movement through the lubricator. The means included within the aerosol lubricator for creating the hollow gas annulus may comprise an annular torsionally flexible member. An aerosol lubricator utilizing such an annular torsionally flexible member may also include means for relieving the pressure across the outer periphery of such annular torsionally flexible member on both sides thereof under conditions of large pressure differentials thereacross. An aerosol generator or lubricator of this invention may also have an adjustable liquid flow control means mounted within the lubricant feed means, said flow control means having a surface portion cooperating with the surface portion of the liquid passage to define a liquid flow path of adjustable length and of a substantially constant cross-sectional area. An aerosol lubricator of this invention may also include protective means which cooperates with the lubricant feed means to preclude exhaust gas from interfering with lubricant flow to the hollow gas annulus of the lubricator.

This invention relates generally to aerosol lubricators and more particularly to lubricators useful in air lines and the like and having constructions with improved performance ranges and which may be quickly, easily and inexpensively assembled, disassembled and maintained. Certain of the lubricators incorporate unique and improved means for producing and maintaining a lubricant feed rate automatically and in accordance with the compressed air flow conditions of the system for entraining in the air stream finely divided particles of lubricant over an extended range of air flow, thus creating a desirable aerosol of lubricant mist and air having improved characteristics.

Reference hereinafter will be for the most part to "gas" or "pressurized gas" but such, of course, includes other gaseous mediums and compressed air which is the usual substance for producing airborne oil fog for lubricating air tools, bearings and other machine parts which constitute the preferred uses of the subject lubricators. Also, emphasis will be directed towards the lubricator field but the principles could apply with respect to aerosols of gas and other liquids, such as insecticides.

The lubricator field is an extensively developed field and many commercial devices are currently available for atomizing and entraining a mist or fog of liquid lubricant in a gas or air stream; however, a need has existed in the industry for a considerable period of time for a unit which will deliver an adequate quantity of lubricating oil at very low air flow rates and which will also deliver an increasing and desirable quantity of lubricant to the air stream as the air flow through the lubricator increases which quantity of lubricant will be proportional to the quantity of air flowing at any particular condition of flow. It is also important to maintain a minimum pressure drop across the lubricator at maximum air flow conditions in order to maintain high efficiency in the operating system, and to atomize and entrain in the gas or air stream finely divided lubricant particles over the complete range of air or gas flow conditions without adversely affecting the size of lubricant particles so entrained. It is also desirable to permit the selection of either unidirectional or bidirectional gas flow sensing means adjacent the joining of the liquid lubricant and gas or a lubricator having a fixed gas orifice with all of the lubricators having improved means for feeding the lubricant to the gas flow. Additionally, another problem which has plagued the industry has been that of maintaining an accurate control over the amount of lubricant flowing from the lubricant container to the point where same becomes atomized and entrained in the air stream without experiencing annoying changes or costly interruptions in the rate of lubricant delivery as a result of fine particles of foreign matter clogging or blocking the passage in which said lubricant travels between the container and the point of atomization and entrainment. Further, heretofore, undesirable interference with the lubricant flow rate frequently occurred as a result of surges of back pressure, such as occurs with the venting of exhaust air or gas, entering into the fluid passage interconnecting the lubricant in the container and the point of atomization and entrainment of the lubricant in the gas stream, this problem being particularly critical where small lubricant flow rates are involved and where bidirectional flow is permitted through the lubricator. Another problem which has been encountered is that of effecting a bidirectional, variable valve means for sensing gas flow without the necessity of using spring-biased members. It has been found that all of these problems can be easily and inexpensively overcome and the needs mentioned accomplished through the use of one of the lubricators of this invention, said lubricators having common elements and parts in many areas.

Thus, one of the objects of this invention is to provide aerosol lubricators having common and interchangeable parts with improved characteristics overcoming and fulfilling, respectively, some or all of the problems and needs mentioned above.

It is also an object to provide aerosol lubricators incorporating unique and novel liquid flow control means in the liquid passage interconnecting the lubricant in the container and the point at which same is atomized or entrained in the gas stream.

Another object of this invention is to provide a lubricator incorporating means for controlling or protecting surges of back pressure from interfering with the flow of lubricant in the liquid passage interconnecting the lubricant in the container and the point of atomization and entrainment thereof in a gas stream.

A further very important object resides in having a lubricator incorporating automatically variable valve means for the gas in the form of an annular torsionally flexible member mounted for bidirectional flexure in the gas passage with the valve means sensing the gas flow in either direction of passage of the gas through the lubricator to create a hollow gas annulus varying in size in accordance with gas flow.

Yet another important object of the invention is to provide a lubricator which includes gas sensing means that results in sufficient decrease in pressure in the gas stream passage at low flow rates to cause the desired lubricant delivery and subsequent atomization but which does not cause excessive pressure drop at higher flow rates, all of which results in, during a wide range of flow conditions, a pressure drop proportional to gas flow with lubricant delivery being proportional thereto.

Yet another foremost object is to provide a lubricator having bidirectional or unidirectional gas flow with improved lubricant feed means for introducing the lubricant into the gas stream at the area of highest velocity and in such a manner that improved mixing of the lubricant and gas results in an aerosol of very finely divided lubricant particles over a wide range of gas flow conditions.

Another object is to provide a lubricator which includes means for sensing gas flow over a wide range of flow conditions with the amount of liquid lubricant being added to the gas stream being proportional to the rate of gas flow.

Further objects and features of novelty of the invention will become apparent when referring, for a better understanding of the invention, to the following description taken in conjunction with the accompanying drawings, wherein.

Figures 1, 3, 4:
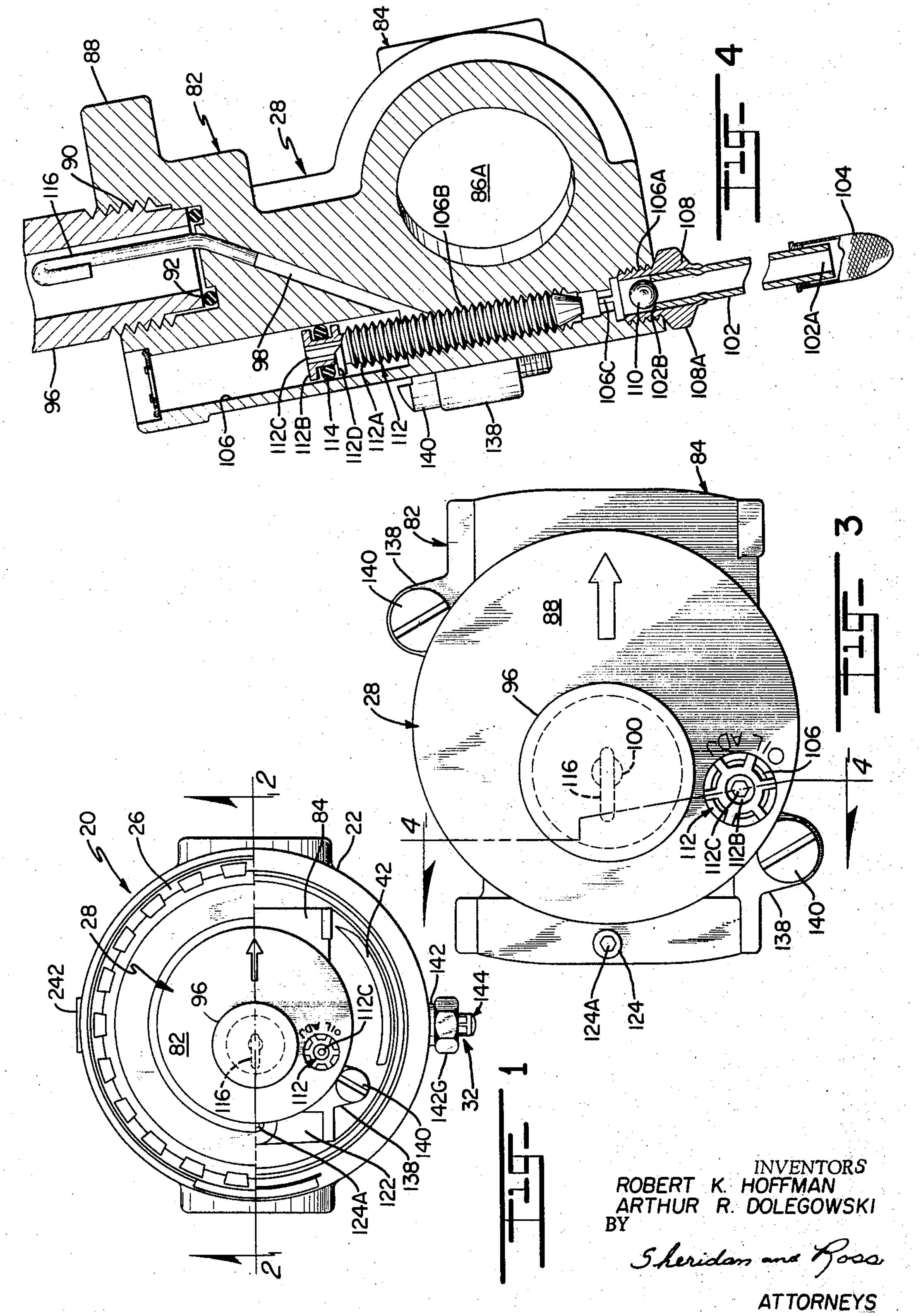
FIGURE 1 is a plan view, partially cut away, of one of the preferred embodiments of a lubricator constructed in accordance with this invention.
FIGURE 3 is a plan view of the cartridge-type insert shown in FIGURE 2.
FIGURE 4 is an elevational view in cross-section taken along line 4—4 of FIGURE 3.
Figure 8:
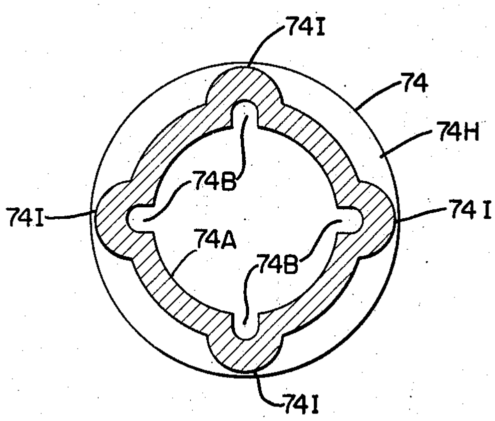
FIGURE 8 is a cross-sectional view taken along line 8—8 of FIGURE 6.
Figure 9:
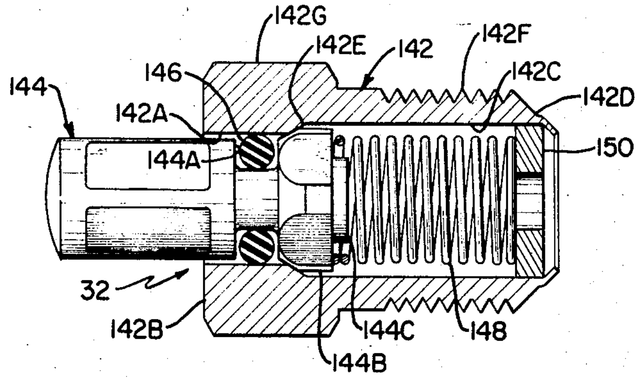
FIGURE 9 is an enlarged elevational view in partial cross-section of the vent valve assembly.
Figure 10:
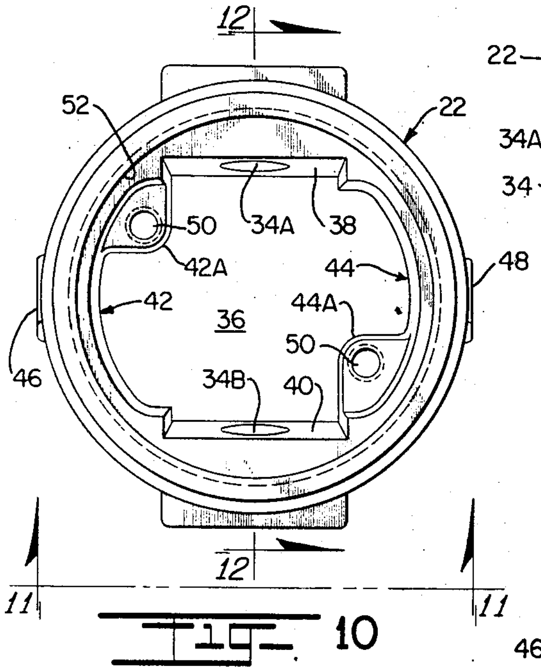
FIGURE 10 is a plan view of the body of the lubricator shown in FIGURE 2.
Figure 12:
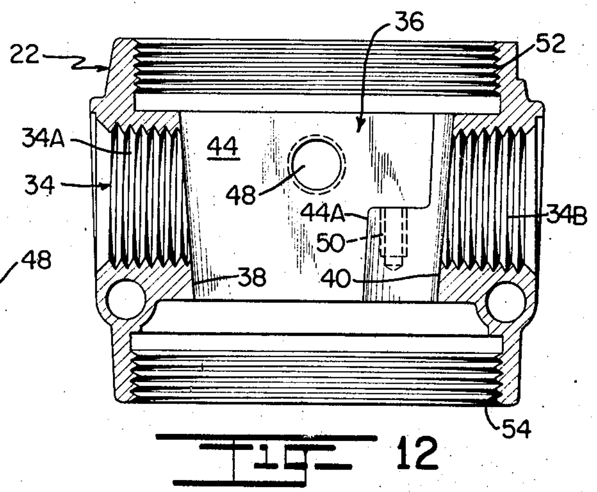
FIGURE 12 is an elevational view in cross-section taken along line 12—12 of FIGURE 10.
Figure 11:
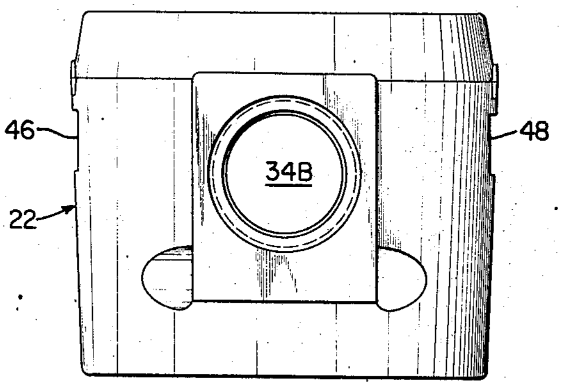
FIGURE 11 is an elevational view taken along line 11—11 of FIGURE 10.
Figure 13:
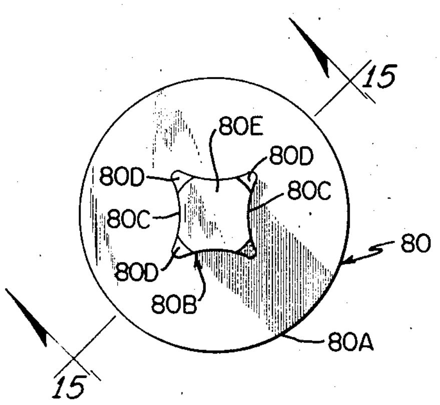
FIGURE 13 is an enlarged elevational view of the oil-fog generator.
Figure 15:
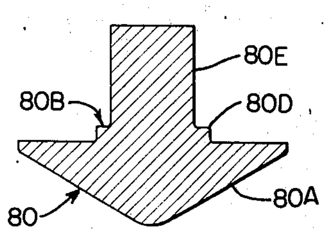
FIGURE 15 is an enlarged cross-sectional view taken along line 15—15 of FIGURE 13.
Figure 14:
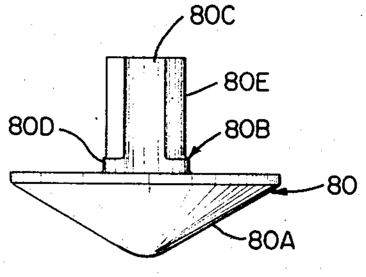
FIGURE 14 is an enlarged side elevational view of the fog generator shown in FIGURE 13.

Referring now to the drawings and particularly to the lubricator shown in FIGURES 1–15, which is the preferred form, a lubricator 20 is shown as comprising a body 22 (see particularly FIGURE 2 and also FIGURES 10–12), a removable lubricant bowl or container 24, a removable cap portion 26, a removable cartridge insert 28 which includes lubricant feed means 29, valve means 30, and a vent valve assembly 32 (see FIGURES 1 and 9). The body 22 of the lubricator 20 is shown as being generally annular in construction and having a gas passage 34 formed therethrough (see FIGURES 2 and 12), the gas passage comprising an inlet 34A and an outlet 34B. The body 22 has an opening 36 (see FIGURE 10) formed therein and disposed generally transverse of and in communication with the gas passage 34. The vertically disposed opening 36 is circumscribed in part by a pair of convergently disposed planar surfaces 38 and 40 and convergently formed arcuate surface portions 42 and 44, the purpose for forming these surfaces convergently being later described. The body 22 also has a pair of threaded openings 46 and 48 formed therein and disposed generally transversely of the gas passage 34. The body 22 additionally has a pair of vertically disposed, threaded recesses 50 formed on opposite sides of the inner periphery thereof on portions 42A and 44A which project generally radially inwardly of each of arcuate surface portions 42 and 44. The vertically disposed opening 36 is circumscribed at each end thereof by threaded portions 52 and 54 (see FIGURE 12).

The cap portion 26 (see FIGURE 2) is generally annular in construction and is externally threaded at 26A. The cap portion 26 has a reduced, internal diameter portion 26B which has an annular groove 26C formed therein in which may be disposed a seal or O-ring 56. The cap portion 26 also has an external annular shoulder 26D formed about the lower end of said externally threaded portion 26A. An annular seal or O-ring 58 may be seated upon said annular shoulder 26D.

The lubricant bowl or container 24 may be made from any suitable material although preferably a transparent material such as any suitable plastic is preferred. The upper portion of the bowl has an external shoulder 24A formed thereabout in which may be seated an annular seal or O-ring 60. The upper portion of the lubricant bowl 24 is externally threaded at 24B adjacent said external shoulder 24A. The lower portion of the lubricant bowl 24 has an opening 24C formed therein in which is disposed a sleeve or annular member 62 which has an annular boss 62A formed about the end disposed within said lubricant bowl 24 and is externally and internally threaded at 62B and 62C, respectively, about the end disposed externally of said bowl 24. A seal or O-ring 63 is disposed intermediate said boss portion 62A and the interior surface of said bowl 24. An internally threaded nut 64 is threadedly engaged to sleeve member 62 thereby securing same within the opening 24C of said bowl 24. A second annular sleeve member 66 having an annular wing nut 68 threadedly mounted therein is itself mounted within said sleeve member 62 by threaded engagement. The members 62, 64, 66 and 68, as assembled, provide a means for draining or withdrawing quantities of lubricant from the lubricant bowl. The O-ring 63 effects a seal between bowl 24 and the assembled members.

Figure 2:
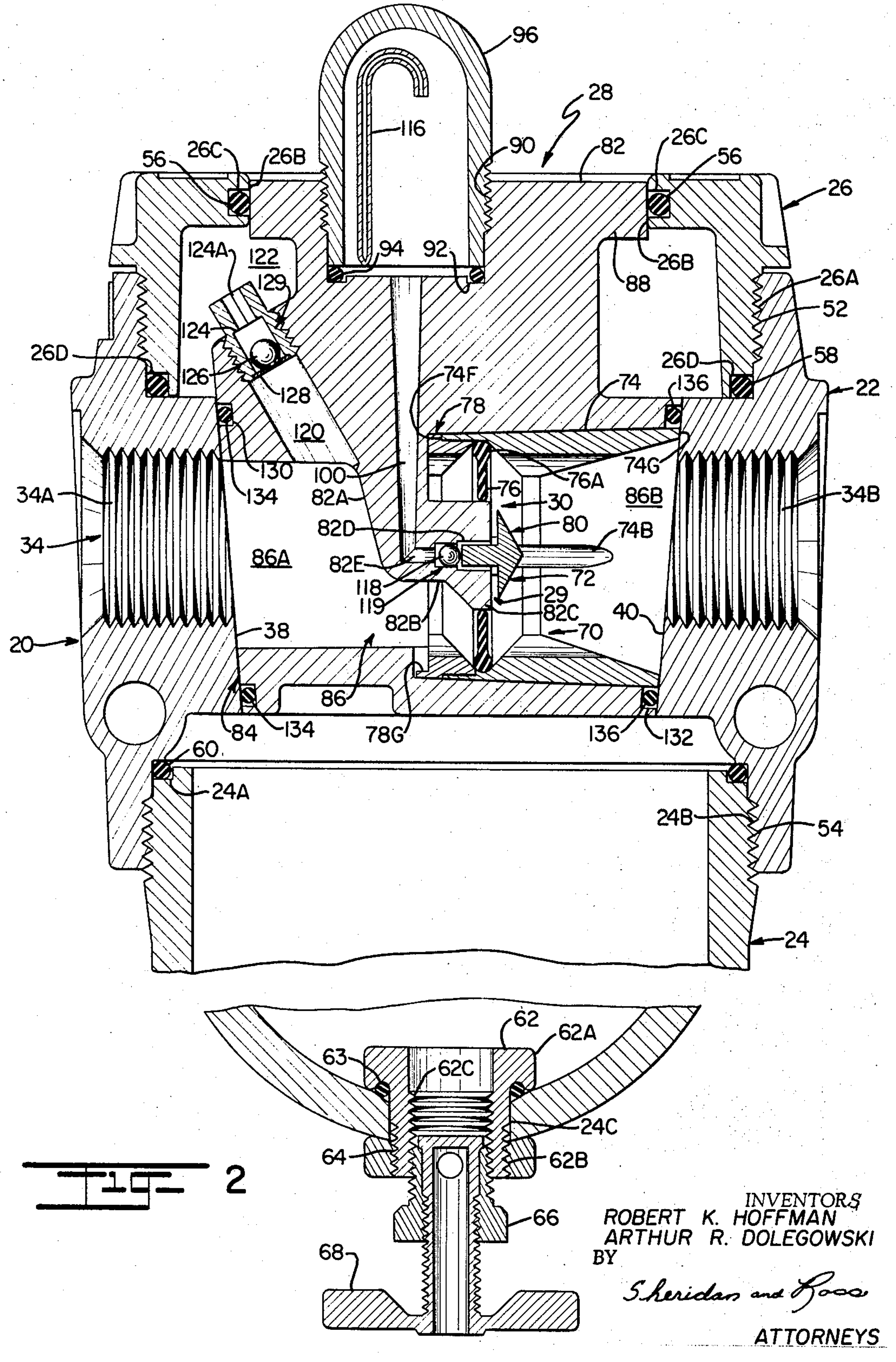
FIGURE 2 is an enlarged elevational view in cross-section taken along line 2—2 of FIGURE 1.
Figure 5:
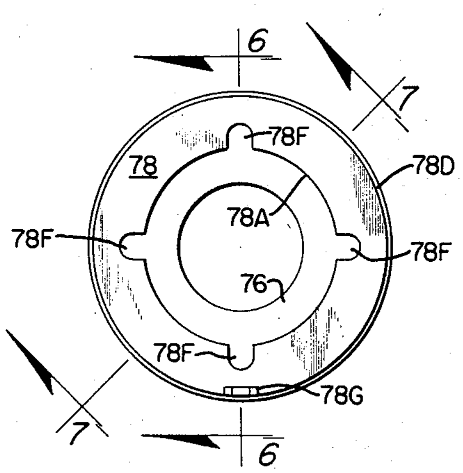
FIGURE 5 is a left end view of a part of the removable portion of the valve assembly shown in FIGURE 2.

Now referring to FIGURES 2–4, the removable cartridge-type insert 28 is now described. The removable cartridge-type insert 28 comprises lubricant feed means 29 which feeds lubricant into an area immediately adjacent the valve means 30. The feed means 29 terminates in portions that form an annular opening and thus, as will be apparent, the lubricant will enter the gas stream, not only at the highest velocity of flow, but also at a multiplicity of points over a 360° area resulting in a large area of intimate contact with the gas stream. The valve means 30 comprises a removable portion 70 (also see FIGURES 5–8) and a fixed or stationary portion 80–82C, the latter also forming one of the terminating portions of the lubricant feed means.

Referring now to FIGURES 5–8, the removable portion 70 of said valve means 30 includes an annular sleeve-type member 74 having an inner, reduced diameter portion 74A and one or more grooves 74B formed on the inner surface of said inner, reduced diameter portion 74A and disposed generally parallel with the longitudinal axis of said member 74. On one side of said inner reduced diameter portion 74A, which is generally designated as the upstream side, the inner surface of said member 74 comprises an axially extending, radially increasing surface 74C which intersects with an axially extending, constant radius surface 74D. Said surface 74D has a longitudinal groove 74E formed in a portion thereof but of less length than the longitudinal length of surface 74D. The removable portion 70 of said valve means 30 also includes an annular, torsionally flexible member 76 the outer periphery 76A thereof being substantially thicker than the remaining portion of said member, and an annular retaining member or ring 78 the longitudinal length of which is approximately the same as the longitudinal length of said axially extending surface 74D of member 74. Said retaining member 78 has an inner surface comprising an axially extending, constant radius portion 78A formed adjacent the upstream portion thereof which intersects an axially extending, radially increasing portion 78B. The outer surface of 78C of said member 78 is generally cylindrically shaped except for a radially outwardly extending flange portion 78D formed adjacent the upstream end thereof and a longitudinal boss portion 78E. Said retaining member 78 has one or more grooves 78F formed in said axially extending surface portion 78A and disposed generally parallel with the longitudinal axis of said member 78. Member 78 also has a key portion 78G formed on the upstream end thereof. The diameter of the outer surface 78C is slightly less than the inner diameter of axially extending surface portion 74D of member 74. The outer diameter of flange portion 78D of member 78 is substantially equal to the outer diameter of the upstream end 74F of member 74. The removable portion 70 of said valve means 30 is assembled by positioning said annular, torsionally flexible member 76 within said member 74 such that said member 76 is disposed upstream of the inner reduced diameter portion 74A of member 74 and thence positioning retaining member 78 within said member 74 on the upstream side of positioned member 76 with boss portion 78E being disposed within groove portion 74E thereby assuring alignment of each groove 74B with a corresponding groove 78F. As assembled member 78 is positioned such that the axially extending, radially increasing surface portion 78B is disposed adjacent said positioned member 76. The upstream end 74F of member 74 lies substantially wholly within a plane that perpendicularly bisects the longitudinal axis of member 74. The downstream end 74G lies in a plane which is inclined slightly from the vertical as viewed in an elevational cross section thereof. The purpose for the inclination of the downstream end 74G is to permit substantial mating contact between said downstream end 74G and the convergently formed surface 40 of the body 22 (see FIGURES 10–12). The purpose for the grooves 78F and 74B is to permit pressure equalization about the periphery of the annular, torsionally flexible member 76 under conditions of high pressure differential and thereby prevent the dislodging of member 76 from its installed position under such conditions. The outer surface 74H of the annular sleeve member 74 is generally concave in form with a plurality of longitudinally extending, circumferentially spaced ridges 74I spanning the concavity. The extremities of said outer surface 74H lie wholly within an axially extending, slightly radially increasing surface, taken in a direction proceeding from the upstream end 74F toward the downstream end 74G. The purpose for using this outer surface configuration is to further facilitate both the molding of the member 74 and the assembling and removing of the removable portion 70 from the cartridge-type insert 28. Members 74 and 78 are formed from any suitable material such as acetyl resin or other plastic material; member 76 is preferably formed from a flexible rubber or rubber-like composition. As will be apparent, member 76 cooperates with element 82C of the feed means 29 at the terminating portion thereof to form valve means 30.

The feed means 29 comprises the fog generating member 80 with downstream surface 72 and suitably mounted within fixed part 82C (which has a surface forming a part of valve means 30), such as by a press fit or threading. The mounting is such that the annular lubricant feed opening is formed whereby the oil is directed in a plane substantially perpendicular to the gas passing through valve means 30. The cylindrically shaped part 82C is a portion of a right-angled of L-shaped member 82B formed on a depending portion 82A of the body 82 of the cartridge-type insert 28. The fog generating member 80 comprises a conically shaped portion 80A characterizing its surface 72 integrally formed with an axially extending portion 80B containing longitudinally extending grooves 80C. Axially extending portion 80B comprises a longitudinally grooved, cylindrically shaped portion 80D of short longitudinal length and a reduced diameter, longitudinally grooved portion 80E. As shown, the grooves 80C formed in portions 80D and 80E are coaxial. The cylindrically shaped portion 80D serves as a spacer in maintaining a predetermined distance between the opposed surfaces of the fog generator 80 and the cylindrically shaped portion 82C of member 82, said opposed surfaces forming the feed opening and comprising the terminal portion of the annular lubricant feed means 29.

The body 82 of the cartridge-type insert 28 is shown in FIGURES 2 and 3 as comprising a bottom portion 84 which is generally rectangular in shape. Said bottom portion 84 has a gas passage 86 formed therethrough. The gas passage 86 comprises an upstream or inlet portion 86A and a downstream or outlet portion 86B. The inlet portion 86A of gas passage 86 is mounted in communication with the inlet portion 34A of gas passage 34 and the outlet portion 86B of gas passage 86 is mounted in communication with the outlet portion 34B of gas passage 34. Depending portion 82A of the body 82 is disposed intermediate said inlet portion 86A and said outlet portion 86B. The body 82 has an upper portion 88 which is cylindrically shaped and has an internally threaded recess 90 formed therein. The bottom of said recess 90 is circumscribed by a groove 92 the inner diameter of which is smaller than the diameter of said recess 90. A seal or O-ring 94 is positioned within said groove 92. A tubular member 96 closed at one end and externally threaded at the other end is threadedly mounted within said recess 90 with the lower end thereof in sealing contact with said O-ring 94. The tubular member 96 is preferably formed of a transparent plastic material to permit visual observation of the flow of lubricant therethrough. The bottom portion of said recess 90 has a pair of liquid passageways 98 and 100 leading downwardly therefrom. One of said passageways 98 (see FIGURE 4) is in communication with a conduit 102 having an inlet 102A positioned near the bottom of the lubricant container 24. Said inlet 102A preferably has a filter or screen 104 disposed thereacross. A passageway 106 having a generally vertically disposed longitudinal axis is formed through the body 82 of said cartridge-type insert 28.

Said passageway 106 interconnects passageway 98 and conduit 102. Said passageway 106 is internally threaded at the bottom portion 106A and also has an internally threaded portion 106B intermediate the ends thereof. The internally threaded portion 106B is preferably of reduced diameter size as compared with the upper portion of said passageway 106. The upper end of conduit 102 is press fit of otherwise suitably mounted within an annular sleeve member 108 which is externally threaded at one end thereof and has a tool receiving portion 108A formed on the other end thereof. A ball 110 having a diameter larger than the inner diameter of said conduit 102 but smaller than the inner diameter of the upper end of sleeve 108 is disposed within said sleeve member 108 and seated upon the upper end 102B of conduit 102. The assembled conduit 102 and sleeve 108 is threadably mounted in the lower portion of passageway 106. Passageway 106 has a triangular section 106C formed intermediate threaded portions 106A and 106B. The sides of section 106C form with body 82 passageways or slots that permit liquid flow therethrough when the ball is in contact with portion 106C. Thus, it will be evident that a check valve is effected with this particular arrangement which permits the flow of lubricant upwardly through portion 106A and portion 106C but prevents flow of lubricant in the reverse direction thus preventing drainage of lubricant downwardly from passageways 98 and 106 during shut off of the lubricator.

Figure 22:
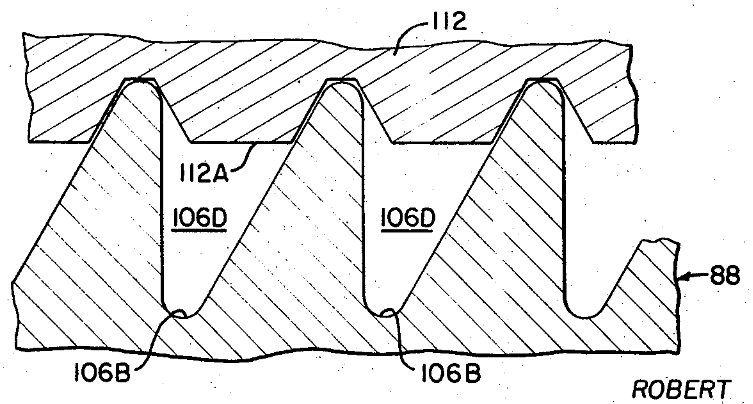
FIGURE 22 is an enlarged, cross-sectional view showing the helical passageway formed between the lubricant flow control means and the inner surface of the bore or passageway in which said means is disposed.

A liquid flow control means 112 comprising an externally threaded portion 112A and a head portion 112B is threadably mounted within said fluid passage 106. The head portion 112B has a tool receiving recess 112C in which may be disposed any suitable tool such as an Allen-head wrench and a groove 112D formed about the periphery thereof in which is disposed a seal or O-ring 114. The externally threaded portion 112A and the internally threaded portion 106B each include a helical groove. The cross-sectional area of the passageway formed between these two helical grooves is substantially constant throughout the length thereof. However, since the pressure drop therethrough is proportional to the length thereof, the amount and rate of lubricant flow therethrough is accurately controlled by controlling the length of the passageway and not by changing the cross section thereof. This constant cross-sectional area feature is better illustrated in the exploded view of FIGURE 22. Thus, since the flow of lubricant is controlled by pressure drop through this helical passage of adjustable length rather than by changing the diameter of the opening, the chances of the fluid flow passage through passageway 106D becoming obstructed with foreign particles are greatly minimized. This is, of course, very beneficial from an operational viewpoint.

A tubular member 116 has one end thereof installed in the upper portion of fluid passageway 98. The other end of tubular member 116 is formed in a U-shape and terminates above the bottom of said recess 90. Thus, such an arrangement admits of visual inspection of fluid or lubricant flow from the tubular member 116 downward into the recess 90 which communicates with passageway 100 extending downwardly into depending portion 82A of body 82. Passageway 100 is in communication with passageway 82E formed in the right-angled portion 82B of body 82 with passageway 82E interconnecting the opening 82D and passageway 100 and having a passageway 82E with a smaller inner diameter than passageway 82D. A ball 118 having a diameter larger than the inner diameter of passageway 82E is disposed within passageway 82D. With the ball 118 mounted in this arrangement, a check valve 119 is effected to prevent the flow of gas from passageway 82D through passageway 82E and upward through passageway 100 during reverse or exhaust flow through passage 86 during which time valve means 30 would function as a by-pass.

Body 82 of cartridge-type insert 28 also has a gas or air passage 120 communicating with the inlet portion 86A of gas passage 86 and the annular passageway 122 circumscribed between the cap portion 26, body 82 of the cartridge-type insert 28 and body 22. The upper portion of gas or air passage 120 is internally threaded as shown. A tubular member 124 having an opening 124A of triangular shape at the top end is threadably mounted within said passage 120. Due to the shape of said opening 124A, any suitable tool may be received for rotating said tubular member 124. The intermediate portion of said opening 124A is of increased diameter as compared to the upper portion thereof and has a ball 126 disposed therein. An annular plate 128 is securely mounted on member 124 at the lower end thereof and the opening through plate 128 is of triangular shape and the same size as opening 124A at its upper end. Accordingly, when ball 126 is resting on plate 128, due to the triangular opening, gas may bleed therethrough and when the ball is against opening 124A the same is true, thus providing a bidirectional pressure relief valve 129. Accordingly, when the lubricator is being charged, primary gas in passageway 120 lifts the ball and gas bleeds through opening 124A, all to exert a pressure upon the surface of the lubricant (not shown) contained in the bowl. When the area above the lubricant in the bowl reaches primary pressure, the ball drops by gravity into the plate 128. Upon shutting down operations and the pressure in areas 86A and 86B approaching atmosphere, the ball 126 is forced against plate 128 due to the pressure of the gas in the bowl above the liquid lubricant and due to the slots caused by the triangular opening in plate 128 and the periphery of the ball, gas bleeds into area 86A and thus pressure throughout becomes equalized. Thus, the size of triangular opening 124A at its top end and that in plate 128, together with the size of the ball, permit the bidirectional relief valve operation described.

Since annular passageway 122 is in communication with the upper portion of the lubricant bowl 24 through the opening circumscribed by body 82 of the cartridge-type insert 28 and the convergently disposed surfaces 42 and 44, which are opposed to portions of said body 82, it will be readily evident that a portion of the pressurized gas flowing through inlets 34A and 86A will be by-passed through passageway 120, opening 124A, annular passageway 122 downwardly into the upper portion of the lubricant bowl 24 thereby exerting a pressure on the upper surface of any lubricant disposed within said bowl 24. The imposition of this gas pressure upon the surface of any lubricant disposed within the lubricant bowl 24 coupled with the decreased pressure and high gas velocity that will exist at the terminating portion of the feed means 29 will cause the lubricant within the lubricant bowl 24 to flow upwardly through the filter 104, conduit 102, passageways 106 and 98, tubular member 116, recess 90, passageways 100, 82E, and 82D, the grooves 80C formed in axially extending portion 80B of the fog generator 80, and thence radially outwardly through the lubricant feed means 29. The radially outwardly flow of the lubricant between the opposed surfaces of the cylindrical portion 82C of the body 82 and the conical shaped portion 80A of the fog generator 80, which comprises the terminal portion of lubricant feed means 29, results in a greatly improved entrainment of finer particles of lubricant than has generally heretofore been possible since the same quantity of lubricant heretofore fed into the gas stream is now divided into a larger number of streams of small sized lubricant droplets and entrained into the high velocity gas or air stream over a larger area than was done previously. Specifically, all of the gas traveling toward flexible or movable wall member 76 in the passage 86A will be converted to a hollow gas annulus having inner and outer peripheries. At low gas flow rates, such will move element 76 to the right when viewed in FIGURE 2 or open the valve means 30 and function with the annular opening of the feed means 29 as venturi means to create a sufficient decrease in pressure to draw the lubricant into the gas stream. It is important to note again that the lubricant will be introduced into the gas stream at the inner periphery thereof and at the area of highest velocity due to the oil feed being in a plane substantially perpendicular to the gas annulus. Again it should be noted that there is a great area of intimate contact upon delivery of oil to the gas stream and not just point delivery which results in a better and finer mixing and an aerosol of extremely finely divided lubricant particles entrained in the gas stream. Upon demand requiring higher gas flow rate, the valve means 30 in effect limits the rate of increase of pressure drop so that it is not objectionable with element 76 sensing the flow rate and moving further to the right to permit enlargement of the gas flow annulus. Thus, a decrease in pressure is obtained but without incurring a relatively large pressure drop across the valve means while at the same time maintaining lubricant entrainment in proportion to the quantity of gas flow and with the same type of aerosol being formed for delivery to the outlet 34B. In other words, the lubricator is self adjusting to demand and delivers the requisite volume of lubricant over an extended range.

A pair of generally circular grooves 130 and 132, one each circumscribing the inlet 86A and the outlet 86B, are formed on the bottom portion 84 of body 82. A seal or O-ring 134 is disposed within groove 130; a seal or O-ring 136 is disposed within groove 132. Thus, seals 134 and 136 prevent leakage between body 22 and the bottom portion 84 of body 82.

As viewed in FIGURES 3 and 4, the bottom portion 84 of the body 82 has a pair of openings 138 in which are disposed screws 140. Said screws 140 are disposed for threaded engagement within internally threaded recesses 50 formed in body 22 (see FIGURES 10 and 12). Thus, the cartridge-type insert 28 is maintained in secured wedging engagement within the body 22 by screws 120.

Now referring to FIGURE 9, the vent valve assembly 32 is shown comprising an annular sleeve member 142 having an opening formed therein. Said opening comprises an axially extending, constant radius surface portion 142A adjacent the outer end 142B of said sleeve member 142 and a second axially extending, constant radius surface 142C adjacent the other or inner end 142D interconnected by an axially extending, radially increasing (proceeding in a direction from the outer end 142B toward the inner end 142D) surface 142E. A plunger 144 is mounted within said opening and has a portion thereof extending outwardly from said outer end 142B of member 142. Said plunger 144 has a groove 144A formed about a portion of the periphery thereof which is normally disposed within a portion of the opening formed within member 142 and circumscribed by surface portion 142A. A seal or O-ring 146 is mounted within said groove 144A for the purpose of effecting sealing contact between said plunger 144 and said surface 142A. Said plunger 144 has an increased diameter portion 144B which is slightly less than the inner diameter of surface portion 142C but larger than the inner diameter of surface portion 142A. Said plunger 144 has an axially extending, cylindrically shaped portion 144C formed adjacent said increased diameter portion 144B but of substantially reduced diameter. A helical spring 148 and an annular plate 150 are positioned within the portion of the opening of member 142 circumscribed by surface 142C. The outer diameters of the plate 150 and the spring 148 are less than the inner diameter of surface portion 142C. The spring 148 is disposed intermediate plunger 144 and the annular plate 150. The inner end 142D of member 142 has a lip swaged as shown to provide a support for said annular plate 150. Axially extending portion 144C of plunger 144 axially positions one end of said spring 148. In the assembled condition, the spring 148 biases the plunger 144 outwardly as shown. Upon depression of the plunger 144, the spring 148 is compressed and the sealing contact maintained between surface portion 142A and plunger 144 is broken and pressurized fluid may flow outwardly of said vent valve assembly. Said sleeve member 142 has an externally threaded portion 142F and a tool receiving surface 142G.

Figure 6:
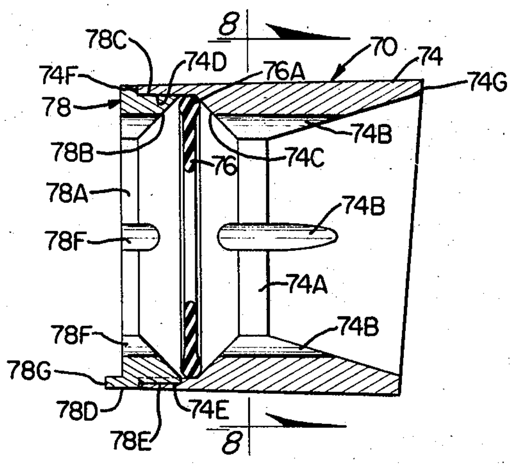
FIGURE 6 is an elevational view in cross-section taken along line 6—6 of FIGURE 5.
Figure 16:
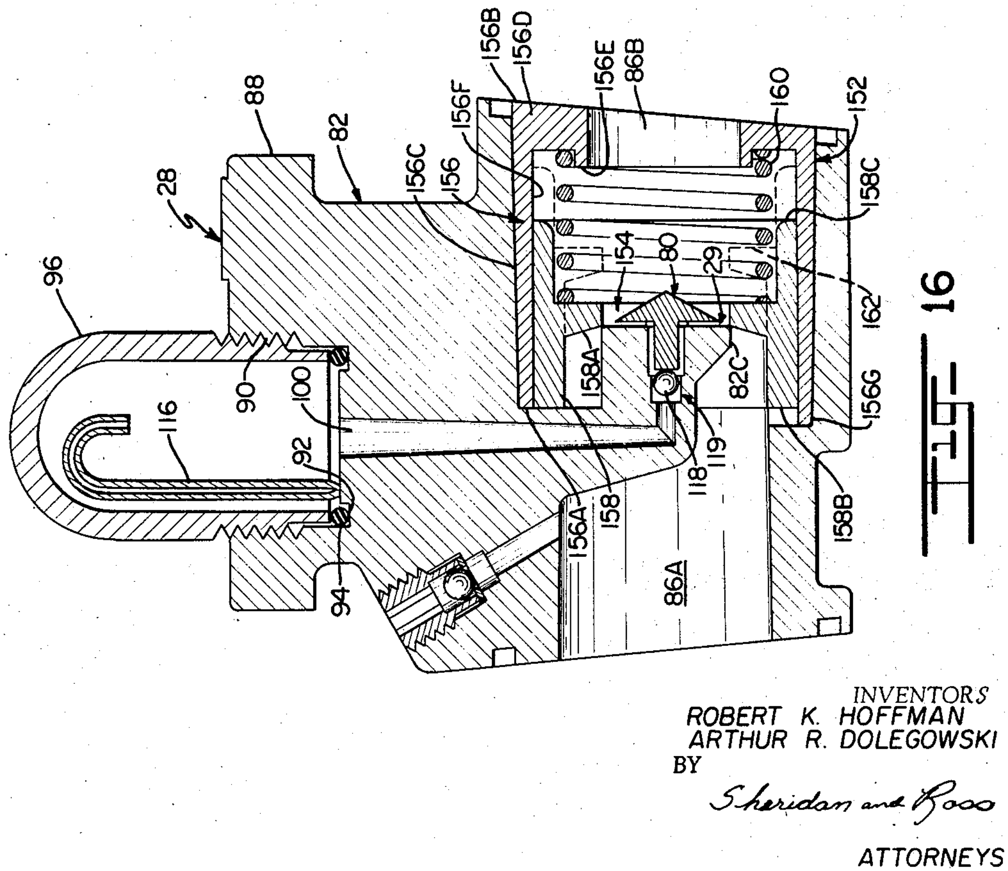
FIGURE 16 is an enlarged elevational view of another embodiment of a lubricator cartridge insert constructed in accordance with this invention.

Now referring to FIGURE 16, another lubricator embodiment is shown with the variations from FIGURE 2 residing in the structure of cartridge-type insert 28. This particular cartridge 28 utilizes a modified removable portion 152 of a unidirectional variable valve means 154. The remaining portion and parts of this cartridge-type insert 28 are identical to that shown and described in connection with FIGURES 2–4; consequently, reference may be had to the description accompanying FIGURES 2–4 concerning the nature and character of such parts and portions. Said removable portion 152 comprises an annular sleeve-type member 156 having an upstream end 156A and a downstream end 156B. Proceeding from the upstream end 156A toward the downstream end 156B, said member 156 has an outer axially extending, radially increasing surface 156C. Said member 156 has a radially inwardly extending flange portion 156D formed adjacent the downstream end 156B. Said flange portion 156D has an annular portion 156E formed on the upstream side thereof. The outer diameter of said portion 156E is substantially smaller than the diameter of the inner surface 156F. Said member 156 also has a key portion 156G formed adjacent the upstream end 156A thereof and upstreamwardly thereof. The key portion 156G serves the same purpose as the key portion 78G of member 78 as shown in FIGURE 2. The upstream end 156A of member 156 lies substantially wholly within a plane that perpendicularly bisects the longitudinal axis of member 156 except for the key portion 156G as previously described. The downstream end 156B of member 156 lies in the plane which is inclined slightly from the vertical as viewed in an elevational cross section thereof and for the same purpose as described previously in connection with downstream end 74G of member 74 as shown in FIGURE 6.

The removable portion 152 of the annular valve means 154 also includes an annular sleeve portion 158 mounted within said member 156 on the upstream side of the flange portion 156D and a helical spring 160 disposed intermediate said flange portion 156D of member 156 and a radially inwardly extending flange portion 158A formed intermediate the upstream end 158B and the downstream end 158C of said member 158. The diameter of the outer surface of member 158 is slightly less than the diameter of the inner surface 156G of member 156. The diameter of the inner surface of flange portion 158A is equal to and preferably slightly smaller than the diameter of the cylindrically shaped portion 82C of body 82. Member 158 is biased toward the upstream direction by means of spring 160. Upon admitting gas or air into the inlet portion 86A having a predetermined higher degree of pressurization than exists in outlet portion 86B, member 158 is moved in a downstream direction thereby compressing spring 160. The degree of movement of member 158 depends upon the amount of pressure differential existing thereacross. The dotted line portion 162 shows an intermediate position of the flange portion 158 only of member 158 as a result of a pressure differential existing thereacross. As a result of the flange portion 158A abutting against the cylindrically shaped portion 82C, it will be readily apparent that no fluid flow can occur in the reverse direction, i.e., from the outlet portion 86B toward the inlet portion 86A. Thus, the valve means 154 formed through the use of a removable portion 152 in combination with the cylindrically shaped portion 82C of member 82 results in the formation of an automatic, unidirectional, variable valve means.

Figure 7:
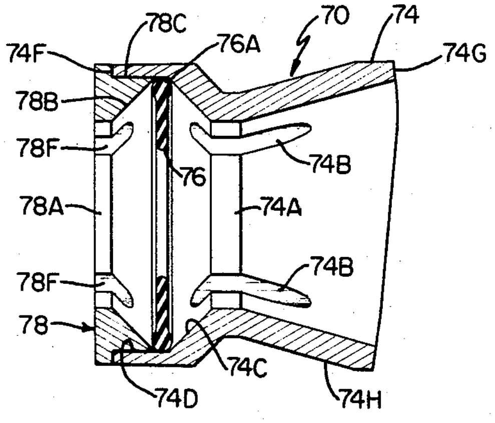
FIGURE 7 is a cross-sectional view taken along line 7—7 of FIGURE 5.
Figure 17:
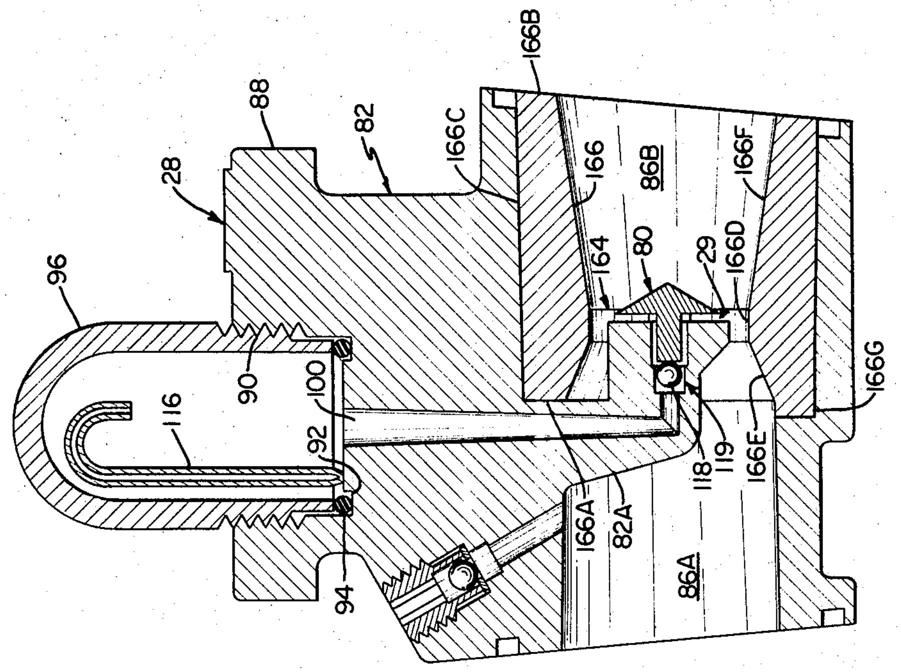
FIGURE 17 is still another lubricator embodiment constructed in accordance with this invention and showing only the cartridge insert thereof.

Referring now to FIGURE 17, a cartridge-type insert 28 similar to that disclosed in FIGURES 2 and 16 is shown incorporating another embodiment. The removable portion of the means 164 which cooperates with a terminating portion of the feed means to form the gas annulus comprises an annular sleeve member 166 having an upstream end 166A and a downstream end 166B. Said member 166 has an outer surface 166C which may be either axially extending, radially increasing from upstream end 166A toward downstream end 166B or the same as surface 74H of member 74 as shown in FIGURES 7 and 8. Said member 166 has an inner surface portion 166D of reduced diameter and on each side thereof, axially extending, radially increasing surface portions 166E and 166F. The upstream end 166A of member 166 lies substantially wholly within a plane that perpendicularly bisects the longitudinal axis of member 166 except for a key portion 166G which extends upstreamwardly thereof. The downstream end 166B of member 166 lies in a plane which is inclined slightly from the vertical as viewed in an elevational cross section thereof. Since the remaining parts and portions of cartridge-type insert 28 are identical to that shown in FIGURES 2–4, reference may be had to the description contained above in connection with FIGURES 2–4 for an understanding thereof.

It will be readily obvious in light of the herein disclosure that means 164 of FIGURE 17 is a fixed means for creating the gas annulus and, of course, exhaust may flow in reverse through means 164. It will also be readily apparent that each of the means 154 and 164 shown in FIGURES 16 and 17, respectively, includes means for creating, at least during the operation of the lubricator, a hollow gas annulus having an inner and an outer periphery and through which substantially all pressurized gas that is to flow through the lubricator for substantially all operating conditions thereof must pass, said hollow gas stream in the annulus being of short axial length with respect to passage 86 and creating a venturi and pressure drop function such that finely divided lubricant particles are fed into a plurality of portions about the inner periphery of said hollow stream during operation of the lubricator.

Figures 18, 20:
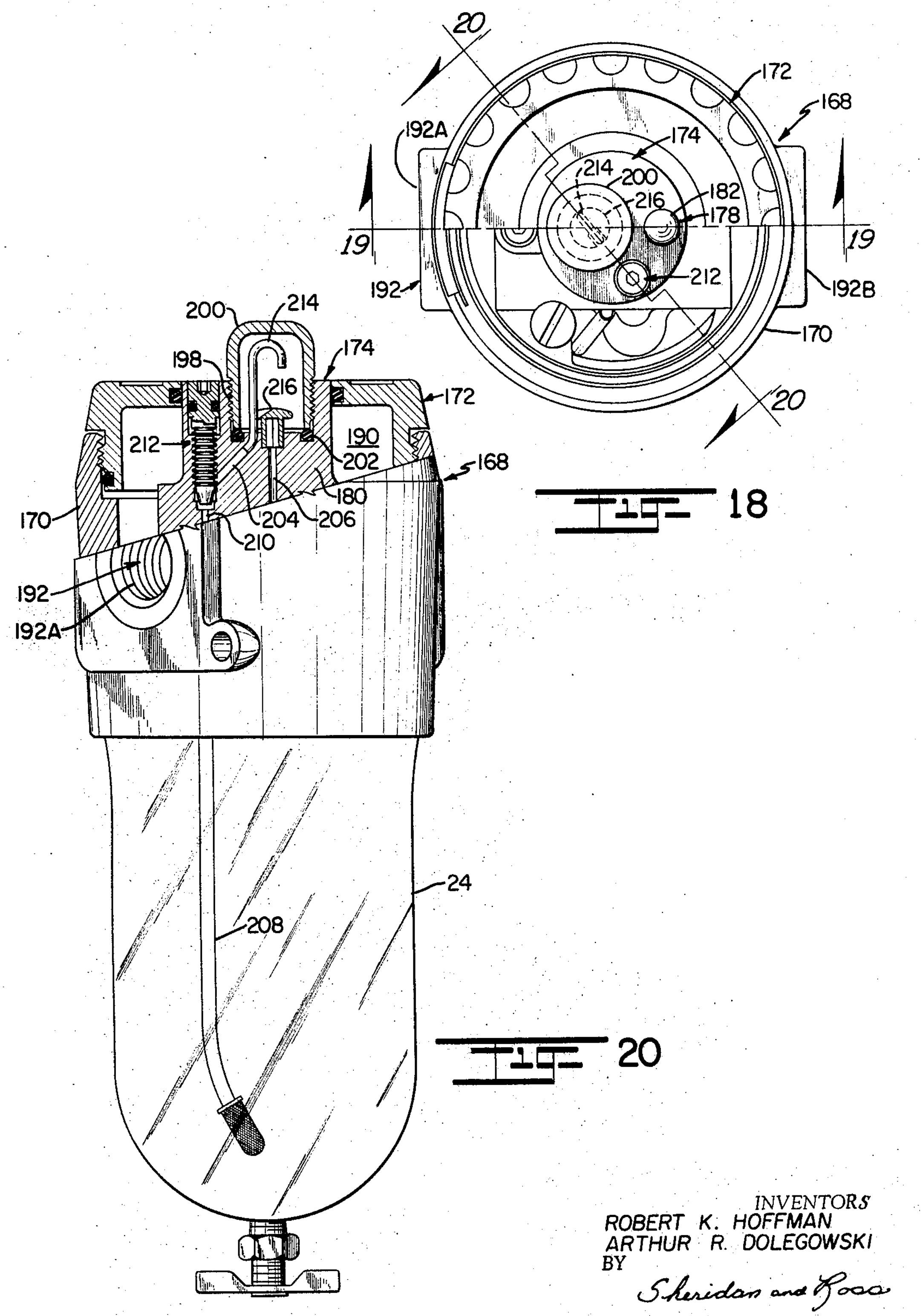
FIGURE 18 is a plan view, partially cut away, of another lubricator constructed in accordance with this invention.
FIGURE 20 is an elevational view, in partial cross-section, taken along line 20—20 of FIGURE 18.
Figure 19:
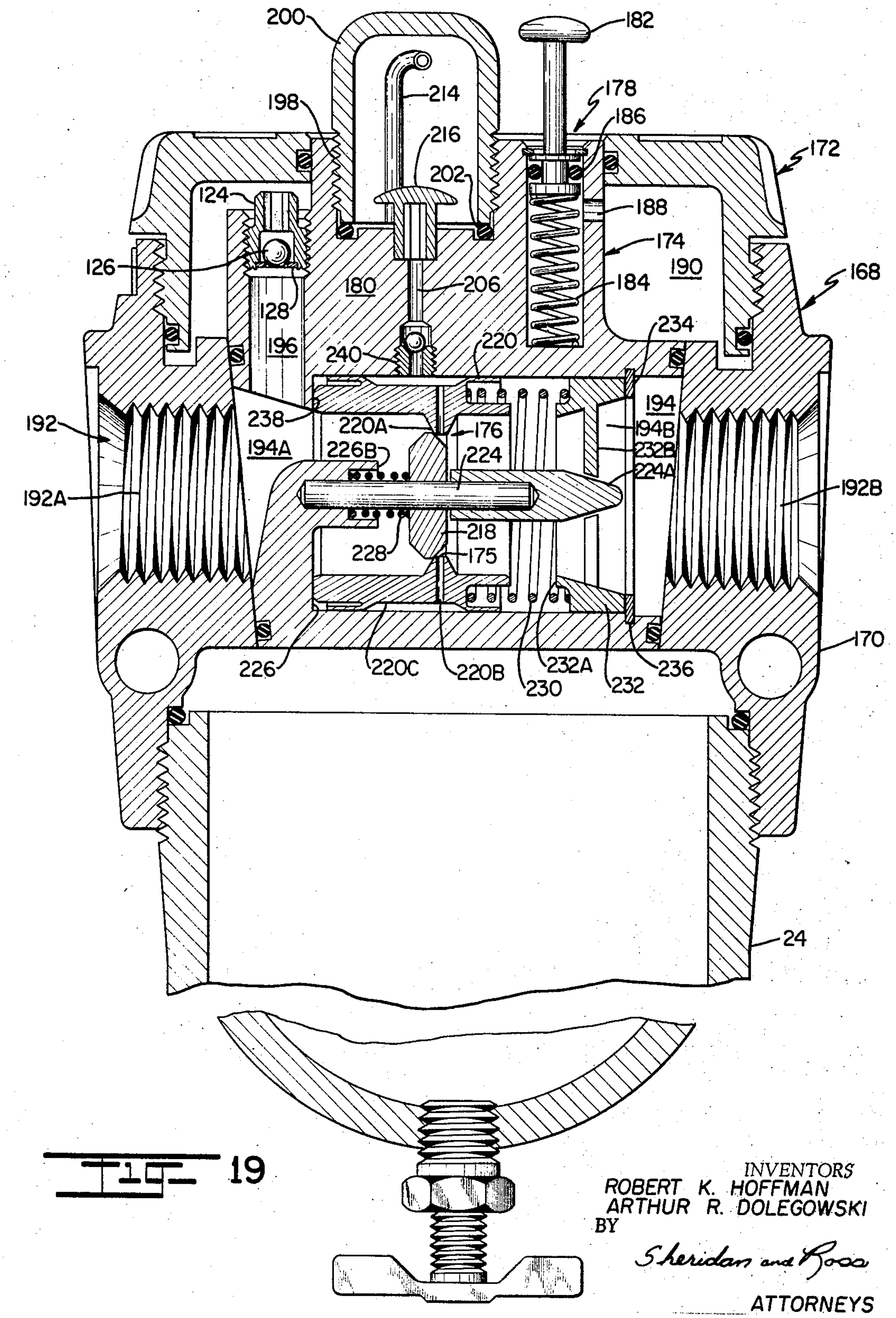
FIGURE 19 is an enlarged elevational view in partial cross-section taken along line 19—19 of FIGURE 18.

Referring now to FIGURES 18–20, another embodiment of a lubricator constructed in accordance with this invention is disclosed. The lubricator 168 shown in these three figures comprises a body 170, a removable lubricant bowl or container 24, a removable cap portion 172, a removable cartridge-type insert 174, which includes lubricant feed means 175, a valve means 176, and a vent valve assembly 178. The body 170 and the cap 172, though differing in some details, are similar in construction to the body 22 and removable cap 26 described above in connection with FIGURE 2. The vent valve assembly 178 is similar in construction to the vent valve assembly 32 shown in FIGURE 9; however, the vent valve assembly 178 is vertically disposed within a recess formed in the body 180 of cartridge-type insert 174 whereas the vent valve assembly 32 is horizontally disposed in an opening 46 (see FIGURES 10 and 11) formed in body 22. The vent valve assembly 178 comprises a plunger 182 biased in the upward direction by a helical spring 184. The plunger 182 has a groove formed about a portion of the periphery thereof. A seal or O-ring 186 is disposed within said groove for effecting sealing contact between said plunger 182 and the inner surface of the recess formed in body 180. A passageway 188 interconnects said recess and an annular passageway 190, said annular passageway 190 being circumscribed by said removable cap 172, lubricator body 170 and body 180 of the cartridge-type insert 174.

The body 170 of the lubricator 168 has a gas or air passage 192 formed therethrough. Said passage 192 comprises an inlet 192A and an outlet 192B. The cartridge-type insert 174 likewise has a gas or air passage 194 formed therethrough comprising an inlet portion 194A and an outlet portion 194B. With the cartridge-type insert 174 mounted within the body 170 of the lubricator 168 as shown in FIGURE 19, the inlet portion 192A of body 170 is in communication with the inlet portion 194A of the cartridge-type insert 174 and the output portion 192B of the body 170 is in communication with the outlet portion 194B of the cartridge-type insert 174.

A gas or air passage 196 is formed in body 174 interconnecting annular passage 190 and inlet portion 194A. The upper portion of passageway 196 is internally threaded and has mounted therein an assembled tubular member 124, ball 126 and annular plate 128 the same as shown in FIGURE 2 and which functions in the same manner and for the same purpose as described above in connection with FIGURE 2.

The body 180 of the cartridge-type insert 174 has a recess 198 formed in the upper surface thereof. A tubular member 200 closed at one end and a seal or O-ring 202 are mounted within said recess 198. The bottom of the recess 198 has a pair of fluid passages 204 and 206 leading downwardly therefrom (see FIGURE 20). Fluid passage 204 is in communication with a tube or conduit 208 having an inlet positioned near the bottom of the lubricant container 24. A liquid passageway 210 having a generally vertically disposed longitudinal axis is formed through the body 180 of the cartridge-type insert 174. Said passageway 210 interconnects passageway 204 and conduit 208. Said passageway 210 is constructed similarly to passageway 106 (see FIGURE 4) and has a liquid flow control means 212, similar to that shown in FIGURES 4 and 22, mounted therein. One end of tubular member 214 is mounted within the upper end of fluid passageway 204 The other end of tubular member 214 is U-shaped and terminates above the bottom of said recess 198. A blast deflector 216 is mounted within the upper portion of passageway 206 and has for its purpose to prevent any surge of back pressure or any exhaust gas or air being vented through said lubricator from interfering with or blowing away the lubricant droplet falling from the end of tubular member 214. The use of such a deflector is important where a check valve is not used between the lubricant feed means 175 and member 214. The interior of recess 198 is in communication with liquid passage 206 through suitable openings formed in the lower portion of blast deflector 216. The lower portion of passageway 206 is in communication with the upper portion of gas passageway 194.

The bidirectional, variable valve means 176 comprises an annular, cylindrically shaped member 218 and an annular tubular member 220 having an inner, reduced diameter portion 220A and a plurality of radially directed openings 220B, preferably uniformly spaced above the circumference of said member 220, extending through said member 220 in the vicinity of said inner reduced diameter portion 220A. The openings 220B form the terminal portion of the lubricant feed means 175 which, as will be apparent, results in feeding lubricant to the gas annulus in a plane perpendicular thereto and at a plurality of points. Cylindrically shaped member 218 is mounted upon a shaft 224 which is positioned coaxial with the longitudinal axis of passageway 194 and has one end thereof securely mounted within L-shaped member 226 which is formed integral with body 180 of cartridge-type insert 174 and which extends upwardly from the bottom surface of inlet portion 194A of passage 194. The other end of shaft 224 has a boss portion 224A formed thereon. The extent of translatory movement of member 218 is limited by said boss portion 224A, which preferably is formed integral with shaft 224, and end 226B of L-shaped member 226. A helical spring 228 is disposed intermediate a portion of L-shaped member 226 and cylindrically shaped member 218 thus biasing said member 218 in a downstream direction. Said tubular member 220 has an outer surface portion 220C of reduced diameter and disposed in communication with said radial openings 220B. Said member 220 is biased in an upstream direction by helical spring 230 which is disposed intermediate one end of member 220 and one end of a generally annular member 232, said member being formed with two or more web portions 232B to provide a support or a guide for the adjacent portion of boss portion 224A. Movement of annular member 232 in a downstream direction is prevented by retaining ring 234 which is removably mounted within a groove 236 formed on the inner surface of outlet portion 194B. Thus, it will be readily appreciated that tubular member 220 is mounted for translatory movement in gas passageway 194, and that the extent of movement is limited by a radially inwardly directing flange portion 238 formed within passageway 194 and the upstream end 232A of annular member 232. It will be readily apparent that when a higher pressure exists on the upstream side of the valve means 176 than on the downstream side thereof, both members 218 and 220 will move in a downstream direction until member 218 abuts against boss portion 224A. Thereafter, member 220 will continue to move in a downstream direction until the force exerted on a projected upstream surface thereof is counterbalanced by the amount of force exerted on member 220 by compressed helical spring 230. When a higher pressure exists on the downstream side of valve means 176 than on the upstream side thereof, cylindrically shaped member 218 and tubular member 220 are moved in an upstream direction until the upstream end of member 220 abuts against member 180. Thereafter, member 218 will continue to move in an upstream direction until the force of pressure on the downstream projection thereof is counterbalanced by the force exerted on member 218 by compressed helical spring 228.

Liquid passageway 206 is in communication with radial grooves 220*b* through a check valve along the lines of 119 in FIGURE 2 and shown generally at 240 which permits the flow of lubricant only in a direction from recess 198 toward said radial grooves 220B. It will be understood, however, that lubricator 168 may be constructed without incorporating check valve 240 therein. In this event, it is quite important that a blast deflector 216 be used as shown. It will also be readily apparent that the axial length of the outer surface portion 220C of reduced diameter is of sufficient size as to maintain fluid passageway 206 in continuous communication with grooves 220B for any operating position of member 220. It will also be readily apparent that valve means 176 includes means for creating, at least during the operation of the lubricator, a hollow fluid stream in the form of an annulus having an inner and an outer periphery and through which substantially all pressurized gas that is to flow through the lubricator for substantially all operating conditions thereof must pass, said valve means functioning similarly to that of FIGURE 2 as well as the means 175 for feeding small sized lubricant particles simultaneously into a plurality of portions about the outer periphery of said hollow stream during operation of the lubricator.

Figure 21:
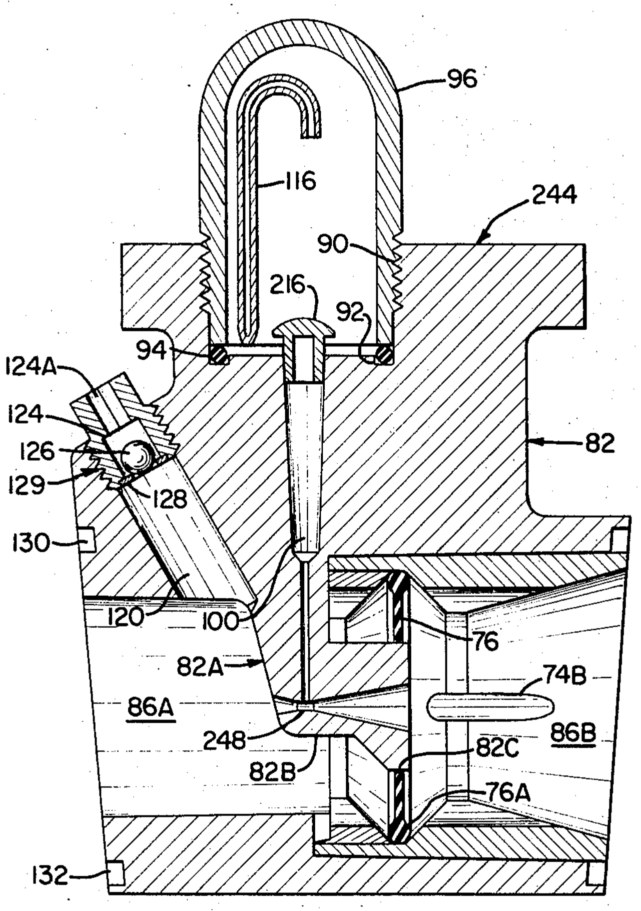
FIGURE 21 is an enlarged elevational view of still another embodiment of a cartridge type insert constructed in accordance with this invention to provide another form of lubricator.

A lubricator containing the cartridge-type insert 244 shown in FIGURE 21 is identical to the lubricator shown in FIGURE 2 except that the cartridge-type insert 244 of FIGURE 21 incorporates a small venturi passage in the base portion 82B of depending portion 82A of member 82, said venturi passage having a reduced section 248 disposed in communication with the lower end of fluid passage 100. The cartridge-type insert 244 further differs from that of FIGURE 2 in that a blast deflector plate 216 is mounted within the upper end of fluid passageway 100 in a similar manner as that shown in FIGURE 19. Of course, in operation the valve means including element 76 functions primarily as a bidirectional by-pass for gas flow with element 76 moving to the right or left in accordance with the flow sensed.

A description of the lubricator shown in FIGURE 2 is now described. As previously indicated, the lubricator of FIGURE 2 incorporates bidirectional, automatically variable valve means 30. Upon installation of the assembled lubricator shown in FIGURE 2 in an appropriate system (not shown) and pressurization thereof, pressurized air or gas flows into inlet portions 34A and 86A. A portion of the pressurized gas or air flows through passageway 120, the pressure relief valve 129, annular chamber 122, downwardly between the cartridge-type insert 28 and the opposed wall portions 42 and 44 of body member 22, into the top portion of lubricator bowl or container 24 thereby resulting in a buildup of pressure which exerts a force upon the surface of the lubricant (not shown) contained within said bowl 24. When the differential pressure existing across the valve means 30 reaches a predetermined amount, depending upon the characteristics of the material from which annular, torsionally flexible member 76 is formed, the inner portion of said member 76 torsionally flexes away from the high pressure existing on the upstream side thereof toward the low pressure area existing on the downstream side thereof thereby permitting the flow of the pressurized gas or air, in the form of a hollow fluid stream, between the torsionally flexed portion of member 76 and the fixed portion 82C of said valve means 30. Due to the decreased cross-sectional flow area resulting in the passage, the velocity of flow is greatly accelerated and a decreased pressure results. The decreased pressure existing at the throat of valve means 30 coupled with the increased pressure existing within lubricant bowl 24 results in a flow of lubricant from lubricant bowl 24 through filter 104, upwardly through conduit 102, through the passageway formed by the inner surface of conduit 106 and the helical groove of adjustable length formed between the external surface portion of fluid flow control means 112, and the internal surface portion 106B of passageway 106, upwardly through fluid passage 98 and tubular member 116, downwardly through recess 90 and fluid passage 100, through passageway 82E, past check valve 119, through passageway 82D, through grooves 80E, radially outwardly through the annular lubricant feed means 29 which comprises the opening formed between the opposed surfaces of cylindrically shaped member 82C and conical shaped member 80A of fog generator 80, and thence into the gas annulus where the lubricant becomes finely divided and entrained in the high velocity gas or air stream flowing therethrough. The operation upon further flow demand and the advantages of the cooperating liquid feed means 29 and the valve means 30 has been explained. When the lubricator of FIGURE 2 is used in conjunction with an air or gas operated tool and the gas or air used to operate the tool is both supplied and exhausted through the lubricator, it will be readily apparent from the above description that such gas or air may be readily exhausted through the bidirectional valve means 30 without disrupting the flow of lubricant to the throat of the valve means 30 and without entraining any lubricant in the exhausted gas or air and thereby wasting same. This latter is accomplished through the incorporation of a check valve 119 in the fluid passageway immediately upstream of the grooves 80E formed in the fog generator 80. Check valve 119 permits the flow of lubricant only when the pressure in inlet portion 86A exceeds the pressure in outlet portion 86B and not otherwise. The flow of lubricant from the bowl 24 to the fog generator 80 is accurately and positively controlled through the use of a novel and unique fluid flow control means 112. The use of liquid flow control means 112 defined makes possible accurate control of lubricant flow while at the same time maintaining through the fluid flow control means at all times a passageway of a maximum size of opening thereby minimizing the tendency which heretofore existed of small diameter particles clogging or obstructing the fluid passage between the bowl 24 and the throat of the valve means 30.

The lubricant bowl 24 may be easily and quickly filled simply by depressing plunger 144 of vent valve assembly 32 thereby exhausting the pressurized gas or air from annular chamber 122 and the interior of the lubricant bowl or container 24, thence removing cap 26, adding lubricant as desired or required, and replacing cap 26. Instead, one could add lubricant by inserting a pressure fill tool (not shown) into plug 242 without venting. It will be readily apparent that the addition of lubricant may be accomplished in a matter of seconds without disassembling the lubricator and even without shutting down the system. Although no lubricant will be entrained in the gas stream flowing through the lubricator toward the tool for this brief interval of time, such has not been found to be detrimental to the operation and life of the tool where such lubricating-filling operations are effected without undue delay.

The lubricator shown in FIGURE 16 is similar in many respects to the lubricator shown in FIGURE 2 except that the cartridge-type insert 28 of FIGURE 16 contains a unidirectional, variable valve means 154. When the differential pressure existing across the valve means 154 reaches a predetermined amount, depending upon the characteristics of the helical spring 160, sensing member 158 is moved in a downstream direction until the force of the pressure exerted on the projected surface of member 158 is counter-balanced by the force of the compressed spring 160. The pressurized air or gas flow between the inner surface of flange portion 158A and the forward or downstream end of cylindrically shaped portion 82C of member 82 to form a hollow gas annulus. Due to the decreased cross-sectional flow area existing between the flange portion 158A and the downstream end of cylindrically shaped portion 82C of member 82, the velocity of flow is greatly accelerated and a decreased pressure results. The decreased pressure zone existing at the throat of valve means 154 coupled with the increased pressure exerted against the lubricant within lubricant bowl 24 results in a flow of lubricant from the lubricant bowl 24 to the throat of the means 154. The lubricant feed means for feeding into the gas annulus is as described in connection with FIGURE 2 as is the operation with respect to increased gas flow upon demand. In the event the pressure within the outlet portion 86B exceeds the pressure in the inlet portion 86A, annular member 158 is moved to the position shown in FIGURE 16 in which the inner part of the flange portion 158A contacts the downstream end of cylindrically shaped member 82C. In addition, under these particular conditions of pressure, ball 118 of check valve 119 moves upstream against the flow of lubricant and seats against the adjacent end of fluid passageway 82E thereby preventing any surges of back pressure from interfering with the flow of lubricant within recess 90 and passageway 100. Thus, not only is the flow of gas through passageway 86 unidirectional but also the flow of lubricant to the throat of valve means 154 is immediately resumed following the dissipation of any surges of back pressure which cause the inner part of flange portion 158 to abut against the downstream end of cylindrically shaped member 82C.

The lubricator shown in FIGURE 17 is similar to that shown in FIGURE 2 except that bidirectional gas annulus forming means 164 is never at any time closed as in the case with the embodiments shown in FIGURES 2 and 16. A lubricator incorporating the cartridge-type insert 174 shown in FIGURE 19 more closely resembles the lubricator of FIGURE 2 rather than that of FIGURE 16 since there is bidirectional valve means and bidirectional flow may also be effected through a lubricator utilizing the cartridge-type insert 174 shown in FIGURE 19.

Referring now to FIGURES 18–20, the operation of the lubricator 168 of these three views is now described. Upon the assembly of lubricator 168 into an appropriate system (not shown) and pressurization of said system, a pressurized gas or air enters inlet portions 192A and 194A. A portion of the pressurized gas or air passes upwardly through passageway 196, the by-pass formed in plate 128, and the opening formed in tubular member 124 into annular chamber 190 and thence downwardly between inner surface portions of body 170 and opposed surface portions of cartridge-type insert 174 into the interior of lubricant bowl 24. When the differential pressure existing across the annular valve means 176 reaches a predetermined amount, depending upon the characteristics of the spring 230, annular, tubular member 220 moves downstream relative of cylindrically shaped member 218 thereby effecting a gas annulus therebetween of reduced cross-sectional area, as compared to the cross-sectional area of passageway 194. Due to the decreased cross sectional flow area existing between members 218 and 220, the velocity of flow is greatly accelerated and a decreased pressure results. The decreased pressure existing at the throat of the annular valve means 176 coupled with the increased pressure existing within lubricant bowl 24 results in a flow of lubricant from the lubricant bowl 24 upwardly through conduit 208 and passageway 210, upwardly through the helical path of variable length formed by the helical groove 212D formed on the fluid flow control 212 and on a portion of the inner surface of passage 210, said helical path being substantially similar to that shown in FIGURE 22, upwardly through fluid passageway 204 and tubular member 214, downwardly into recess 198 and past blast deflector 216 (in all instances the part connected to the cartridge insert comprises spaced prongs), downwardly through fluid passageway 206 and past check valve 240 into the chamber circumscribed by the inner surface of passageway 194 and the outer surface portion 220C of reduced diameter of member 220, and thence radially inwardly through openings 220B into the throat of annular valve means 176 where the lubricant becomes finely divided and entrained in the gas or air annulus flowing therethrough, the feed means and operation at greater gas flow rates being the same as described in connection with FIGURE 2. When the lubricator of FIGURES 18–20 is used in conjunction with an air or gas operated tool and the gas or air used to operate the tool is both supplied and exhausted through the lubricator, it will be readily apparent from the above description that such gas or air may be readily exhausted through the bidirectional valve means 176 without disrupting the flow of lubricant to the throat of the valve means 176 and without entraining any lubricant in the exhausted gas or air and thereby wasting same. This latter is accomplished through the incorporation of check valve 240 at the lower portion of fluid passageway 206. This check valve permits the flow of lubricant only when the pressure in inlet portion 194A exceeds the pressure in outlet portion 194B and not otherwise. When the pressure within the outlet portion 194B exceeds the pressure within the inlet portion 194A by a predetermined amount, the cylindrically shaped member 218 is caused to move upstream relative to the flange portion 220A of member 220 thereby effecting a passageway between flange portion 220A and cylindrically shaped portion 218. Except for the incorporation of check valve 240 in fluid passageway 206, lubricant would continue to be entrained in the throat of annular venturi means 176 although not at the same rate since the differential pressure between the interior of lubricant bowl 24 and the throat of the annular valve means 176 would not be nearly as great as for conditions of flow from the inlet portion 194A to the outlet portion 194B. Thus, should it be desired or necessary to entrain lubricant for conditions of reverse flow through the lubricator 168, such can be accomplished through the removal of the check valve 240 from the lubricator 168.

The operation of a lubricator incorporating the cartridge-type insert of FIGURE 21 is similar to that of the lubricator shown in FIGURE 2 except that for small flow rates of pressurized gas all such pressurized gas flows through the small venturi passage including area 248. Additionally, for larger flow rates of pressurized gas, atomization and entrainment of the lubricant particles occurs within the small venturi passage with some of the gas by-passing through the bidirectional by-pass valve 76 in the form of a gas annulus with such stream joining and mixing with the aerosol from area 248. The annular torsionally flexible member functions with portion 82B as a bidirectional gas by-pass valve in this embodiment but is mounted in the cartridge insert as in FIGURE 2 for permitting operation thereof. Further, the blast deflector plate 216 is used in lieu of the check valve 119 shown in FIGURE 2.

It should be apparent from the foregoing descriptions that the advantages and objects of the lubricators of this invention are fulfilled during the operation thereof with the scope of the invention being defined in the following claims.

What is claimed is:

1. An aerosol generator comprising a body having a passage formed therethrough, said passage having an inlet for pressurized air and an outlet, said body having a substantially transverse opening formed therein and intersecting said passage substantially intermediate said inlet and said outlet; a liquid supply means forming a part of said body; an insert portion having at least a part thereof mounted within said transverse opening, said insert portion having a passage formed therethrough and interconnecting said inlet and said outlet of the body passage, said insert portion having means formed within the passage thereof for forming during travel of pressurized gas therethrough a pressurized gas flow annulus and means for feeding liquid from the supply means to said insert passage to join pressurized gas thus creating aerosol for movement through said outlet, said feeding means including a liquid passage having adjustable liquid flow control means disposed therein, said flow control means having a surface portion cooperating with a surface portion of the liquid passage to define a liquid flow path of adjustable length and of substantially constant cross-sectional area.

2. An aerosol generator comprising a body having a passage formed therethrough, said passage having an inlet for pressurized air and an outlet, said body having a substantially transverse opening formed therein and intersecting said passage substantially intermediate said inlet and said outlet; a liquid supply means forming a part of said body; an insert portion having at least a part thereof mounted within said transverse opening, said insert portion having a passage formed therethrough and interconnecting said inlet and said outlet of the body passage, said insert portion having means formed within the passage thereof for forming during travel of pressurized gas therethrough a pressurized gas flow annulus and means for feeding liquid from the supply means into the smallest cross-sectional area of said gas flow annulus to join pressurized gas flowing through said gas annulus thereby creating aerosol for movement through said outlet, said insert portion being removably mounted in said body, said means for forming the annulus comprising a fixed element and a removably positioned element, said fixed element and said removably positioned element cooperating to permit bidirectional flow of gas through said annulus and protective means cooperating with the feeding means to preclude gas interfering with liquid flow to said insert passage.

3. A lubricator comprising a body having a passage formed therethrough, said passage having an inlet for pressurized gas and an outlet for an aerosol of said gas and liquid lubricant, a liquid lubricant supply means forming a part of said body, liquid lubricant feed means for conveying lubricant and pressure responsive means for creating during travel of gas in the passage a hollow gas annulus having an inner and outer periphery and through which substantially all pressurized gas that is to flow through the lubricator for substantially all operating conditions thereof must pass, said lubricant feed means terminating in a plane disposed substantially perpendicular to the direction of gas flow through said annulus and including means for feeding lubricant into a plurality of portions of the inner periphery of said hollow gas annulus and at the region of smallest cross-sectional area of said annulus, said pressure responsive means including an annular torsionally flexible member mounted for bidirectional flexure to permit bidirectional flow of gas through said annulus.

4. A lubricator comprising a body having a passage formed therethrough, said passage having an inlet for pressurized gas and an outlet for an aerosol of said gas and liquid lubricant, a liquid lubricant supply means forming a part of said body, liquid lubricant feed means for conveying lubricant and a pressure responsive valve means for creating during travel of gas through the passage a hollow gas annulus of variable cross-sectional area and through which substantially all pressurized gas that is to flow through the lubricator for substantially all operating conditions thereof must pass, said gas annulus having an inner and outer periphery, the cross-sectional area of said gas annulus varying in accordance with the amount of gas flow therethrough, said lubricant feed means including a discharge means for feeding lubricant into a plurality of portions at one of said peripheries of said hollow gas annulus and at the region of smallest cross-sectional area of said annulus.

5. A generator as defined in claim 4 in which said feed means includes a liquid passage having adjustable liquid flow control means disposed therein, said flow control means having a surface portion cooperating with a surface portion of the liquid passage to define a liquid flow path of adjustable length and of substantially constant cross-sectional area.

6. A lubricator as described in claim 4 in which said valve means is located immediately adjacent the discharge portion of said feed means, said discharge portion being disposed for feeding lubricant in a direction substantially perpendicular to the direction of gas flow through said annulus.

7. A lubricator as described in claim 6 in which said valve means includes a pressure responsive annular, torsionally flexible member having the inner periphery thereof mounted for bidirectional torsional flexure relative to the discharge portion of said lubricant feed means to permit bidirectional flow of gas through said annulus, said inner periphery of said annular, torsionally flexible member cooperating with said discharge means of said lubricant feed means to create said hollow gas annulus.

8. In an aerosol lubricator having a body with a pressurized gas passage therethrough including inlet and outlet means, liquid lubricant supply means, lubricant feed means for feeding lubricant from the supply means to gas conveyed to said passage to form an aerosol for movement through said outlet, the combination therewith of a pressure responsive valve means for controlling substantially all the gas that is to flow through said passage, said valve means including an annular torsionally flexible member mounted for creating during travel of gas in the passage a hollow gas annulus, said member also being mounted for bidirectional flexure in said passage to permit bidirectional flow of gas through said annulus.

9. In an aerosol lubricator as defined in claim 8 wherein said annular member cooperates with at least one element in the passage to create, upon torsional flexure of said annular member, a hollow gas annulus with the annular member varying the size of the annulus in accordance with gas flow.

10. Apparatus as defined in claim 8 wherein means is provided in the passage for relieving the pressure across the outer periphery of said annular member on both sides thereof upon movement of the outer periphery of said annular member.

11. Apparatus as defined in claim 8 wherein there is provided in the passage a pair of tubular members, portions of which are mounted concentrically one with respect to the other, the outer periphery of said annular, torsionally flexible member being disposed between said tubular members, said tubular members including means for relieving the pressure across the outer periphery of said annular, torsionally flexible member upon movement of the outer periphery of said annular member.

12. A lubricator comprising a body having a passage formed therethrough with inlet means for pressurized gas and an outlet for an aerosol of said gas and liquid lubricant, lubricant feed means for conveying lubricant and means for creating in the passage a hollow gas annulus having an inner and outer periphery and through which substantially all pressurized gas that is to flow through said lubricator for substantially all operating conditions thereof must pass, said lubricant feed means having a terminating portion disposed for feeding lubricant in a direction substantially perpendicular to the direction of gas flow through said annulus such that the lubricant is fed into a plurality of portions of one of said peripheries of said gas annulus and at the region of smallest cross-sectional area of said annulus to join pressurized gas thus creating aerosol for movement through said outlet.

13. A lubricator as defined in claim 12 wherein the means for creating the annulus comprises a fixed annular element in said passage having its inner surface in spaced relation from the terminating portion of said feed means, said terminating portion of said feed means defining an annular opening.

14. A lubricator as defined in claim 12 wherein the means for creating the annulus comprises valve means adjacent the terminating portion of the feed means at least a portion of, said valve means being movable in response to at least one direction of gas flow in the passage to vary the size of said annulus in accordance with the amount of gas flow.

15. A lubricator as defined in claim 12 wherein the valve means includes a portion mounted for bidirectional movement in the passage to permit bidirectional flow of gas therethrough.

16. A lubricator as defined in claim 15 wherein said portion of said valve means comprises an annular torsionally flexible member.

17. A lubricator as defined in claim 16 wherein means is provided in the passage for relieving the pressure across the outer periphery of said annular member on both sides thereof upon movement of the outer periphery of said annular member.

18. A lubricator as defined in claim 14 wherein said portion of said valve means is mounted for unidirectional flow of gas only through said annulus and comprises an annular member spring biased towards said terminating portion but movable axially from said portion in accordance with gas flow.

19. A lubricator as defined in claim 14 wherein the feed means includes an insert member in the passage mounted for movement in the passage by gas flow in one direction, said member forming a part of the valve means and having a series of radially directed spaced openings forming the terminating portion of said feed means.

20. A lubricator as defined in claim 19 wherein said insert member is spring biased in the opposite direction and there is provided a second member spring biased in the one direction and mounted within said insert member for movement in the opposite direction and against the bias applied thereagainst, the second member cooperating with the insert member to form said valve means.

References Cited

UNITED STATES PATENTS

| | | | |
|---|---|---|---|
| 2,638,182 | 5/1953 | Boretti | 184—55 |
| 2,751,045 | 6/1956 | Faust | 184—55 |
| 2,921,649 | 1/1960 | Wilkerson | 184—55 |
| 2,982,376 | 5/1961 | Lincoln | 184—55 |
| 2,998,021 | 8/1961 | Becker | 184—55 X |
| 3,115,949 | 12/1963 | Malec | 184—55 |
| 3,149,698 | 9/1964 | Riske et al. | 184—55 |

LAVERNE D. GEIGER, *Primary Examiner.*

HOUSTON S. BELL, *Examiner.*